United States Patent [19]
Jaycox

[11] Patent Number: 5,235,134
[45] Date of Patent: * Aug. 10, 1993

[54] SEALED REENTERABLE SPLICE ENCLOSURE

[75] Inventor: Donald F. Jaycox, Riverwoods, Ill.

[73] Assignee: Reliance Comm/Tec Corporation, Chicago, Ill.

[*] Notice: The portion of the term of this patent subsequent to Oct. 8, 2008 has been disclaimed.

[21] Appl. No.: 735,285

[22] Filed: Jul. 24, 1991

Related U.S. Application Data

[63] Continuation-in-part of Ser. No. 531,879, May 31, 1990, Pat. No. 5,055,636.

[51] Int. Cl.$^5$ .................. H02G 15/06; H01R 43/00
[52] U.S. Cl. .................................. 174/87; 156/49; 174/38; 174/77 R; 174/93
[58] Field of Search .................. 174/87, 37, 38, 77 R, 174/93; 156/49

[56] References Cited

U.S. PATENT DOCUMENTS

| | | | |
|---|---|---|---|
| 1,780,686 | 11/1930 | Proos | 174/77 R |
| 2,688,651 | 9/1954 | Blake | 174/93 |
| 2,938,940 | 5/1960 | Calendine et al. | 174/76 |
| 3,569,608 | 3/1971 | Ance | 174/93 |
| 3,655,907 | 4/1972 | Philibert et al. | 174/77 R |
| 3,710,003 | 1/1973 | Channell | 174/37 |
| 3,728,467 | 4/1973 | Klayum et al. | 174/38 |
| 3,769,443 | 10/1973 | Pierzchala et al. | 174/38 |
| 3,848,074 | 11/1974 | Channell | 174/38 |
| 3,919,460 | 11/1975 | Neail et al. | 174/87 |
| 4,267,401 | 5/1981 | Wilkinson | 174/77 R |
| 4,488,013 | 12/1984 | Ziegler | 179/175.1 R |
| 4,600,261 | 7/1986 | Debbaut | 174/76 X |
| 4,622,436 | 11/1986 | Kinnan | 174/77 R |
| 4,634,207 | 1/1987 | Debbaut | 74/76 X |
| 4,886,939 | 12/1989 | Kinnan | 174/77 R |
| 4,902,855 | 2/1990 | Smith | 174/77 R |
| 4,988,834 | 1/1991 | Birch | 174/93 |
| 5,007,701 | 4/1991 | Roberts | 174/23 R X |
| 5,055,636 | 10/1991 | Jaycox | 174/87 |

OTHER PUBLICATIONS

PST Pedestal Splice Closure; 3M Corporation Instruction Bulletin; Issue 4, Jul. 1987.
Channell Commercial Corporation Product Bulletin (best copy available), (no date).

*Primary Examiner*—Morris M. Nimmo
*Attorney, Agent, or Firm*—Trexler, Bushnell, Giangiorgi & Blackstone, Ltd.

[57] ABSTRACT

A method and apparatus for sealing a splice enclosure to protect cable splice connections retained therein. A sealing member is a single piece body integrally formed of a suitable material which resists detrimental environmental effects and is resiliently compressible in an axial direction to seal the splice enclosure. Axial compression of the sealing member is employed to create sealing forces both about the outer periphery of the sealing member and between the sealing member and cables projecting therethrough. The axial compression is applied to the sealing member by a seal neck member which presses the sealing member into a shell member. A retainer plate may optionally be interposed between the sealing member and a retaining edge part of the shell member. A buffer ring may optionally be interposed between the sealing member and a compressing surface portion of the seal neck member. Reentry into the enclosure does not require destruction of the sealing member and does not require tapes, adhesives or other materials and is hence very time, labor and material efficient.

33 Claims, 5 Drawing Sheets

SEALED REENTERABLE SPLICE ENCLOSURE

CROSS-REFERENCE TO RELATED APPLICATION

This is a continuation-in-part of earlier application Ser. No. 07/531,879, filed May 31, 1990 U.S. Pat. No. 5,055,630.

BACKGROUND OF THE INVENTION

This invention relates to the splice enclosure arts and more specifically to an apparatus and method for sealing splice enclosures.

Dependency upon telecommunications and data communications presses the technology to provide consistent high quality communications with minimal down time. A key to providing high quality communications with minimal down time is to protect installations at critical points and provide for quick and efficient in-field repairs.

In the communications field it is common to install multi-carrier primary cables to provide communication service to a predetermined area. The primary cable, consists of perhaps approximately 100 individual binder groups of multiple wire pairs.

At specific points along the primary cable, connections must be made to route individual wire pairs to end user locations. Primary cables are typically very long continuous cables and are not conveniently manufacturable with specific service cable lengths at predetermined break off points. In this situation, it becomes necessary to extract specific binder groups from the primary cables and to splice these wire pairs to service cables which are then routed to the end user locations.

The splice connection between the service cable and the primary cable wire pairs must be protected from the environment in which it is installed, since moisture, oxygen, temperature, and the accumulation of dust and dirt or chemicals may individually or cumulatively act to the detriment of the splice connections. Typically, prior art splice encloses protects a portion of primary cable and the splice connections in a so-called dome enclosure. The dome enclosure is an elongate sleeve-like structure having a closed end and an open end through which the primary cable and service cables are inserted and from which these cables project. To protect the primary cable and the splice connections from detrimental environmental effects, the open end of the dome enclosure must be sealed.

Current dome enclosure sealing technology has problems which must be overcome to improve telecommunications quality and minimize down time for repairs. For example, a typical prior art sealing arrangement which seals the opening formed in the dome enclosure must be individually fabricated for each installation which is to be sealed. The sealing arrangement is fabricated by repeatedly wrapping tape-like material around the cables projecting through the opening and then inserting the wrapped cables in the opening. The dome enclosure then employs some form of circumferential constricting apparatus to circumferentially compress the wrapped cables to enhance the seal.

This type of prior art sealing arrangement is complex and time consuming to assemble and unnecessarily lengthens down time for installations and repairs. The problem is exacerbated when a repair or modification is needed to the splice connections since under the circumstances the sealing arrangement must be severed and removed and a new sealing arrangement re-constructed. This type of prior art sealing arrangement and method unnecessarily wastes time and valuable resources.

A specific example of a prior art enclosure and sealing arrangement is the PST pedestal splice closure manufactured by 3M, TeleComm Products Division, Austin, Tex. This arrangement is also shown in U.S. Pat. No. 4,902,855 to Smith. In this prior art splice enclosure, the cables are inserted into a dome enclosure and the open end is sealed. A sealing arrangement is formed through the tape wrapping method described above. This method forms a seal which is inherently non-uniform thereby creating potential for problems with the fit inside of the dome member and/or any circumferential compression fitting or clamp used to engage and seal the structure. Further, depending upon the type of tape used, the ground wires may have to be separately wrapped prior to incorporation into the common seal. The sealing arrangement as formed is then inserted into the open end of the dome enclosure and a shrink tubing is positioned and shrunk around the outside of the dome to retain the sealing member therein. Alternately, a clamp may be used, as shown in the above-mentioned '855 patent.

As mentioned above, this type of prior art sealing system is inherently extremely time consuming and material intensive. Further, this system risks cutting or otherwise damaging cable jackets in attempting to remove the shrink tubing as well as the sealing member when repairing or modifying splice connections. Additionally, sufficient supplies such as tapes and shrink tubing must always be on hand or further delays due to lack of supplies may result when installing or repairing splice connections.

OBJECTS AND SUMMARY OF THE INVENTION

It is an object of the present invention to provide a reusable and easily reenterable splice enclosure for protecting splice connections made to a primary cable.

Another object of the present invention is to provide a sealing apparatus and sealing method which facilitates ease of access to the splice connections for providing efficient access and resealing of the splice enclosure.

A more specific object of the present invention is to provide a splice enclosure sealing member which is axially compressed to create sealing forces between an opening in a dome enclosure and cables projecting therethrough.

Briefly, and in accordance with the foregoing, the present invention comprises a method and apparatus for sealing a splice enclosure to protect cable splice connections retained therein. The sealing member is a single piece body integrally formed of a suitable material which resists detrimental environmental effects and is resiliently compressible in an axial direction to seal the splice enclosure. Axial compression of the sealing member is employed to create sealing forces both about an outer periphery of the sealing member and between the sealing member and cables projecting therethrough. Reentry into the enclosure does not require destruction of the sealing member and does not require tapes, adhesives or other materials and is hence very time, labor and material efficient.

BRIEF DESCRIPTION OF THE DRAWINGS

The organization and manner of the operation of the invention, together with further objects and advantages thereof may be understood best by reference to the following description taken in connection with the accompanying drawings wherein like reference numerals identify like elements and in which.

DETAILED DESCRIPTION OF THE ILLUSTRATED EMBODIMENT

While this invention may be susceptible to embodiment in different forms, there is shown in the drawings and will be described herein in detail a specific embodiment of the present invention with the understanding that the present disclosure is to be considered an exemplification of the principals of the invention, and not intended to limit the invention to the embodiment illustrated and described herein.

It should be noted that dimensional relationships between members of the illustrated embodiment may vary in practice or may have been varied in the illustrations to emphasize certain features of the invention.

Figures 1, 2:
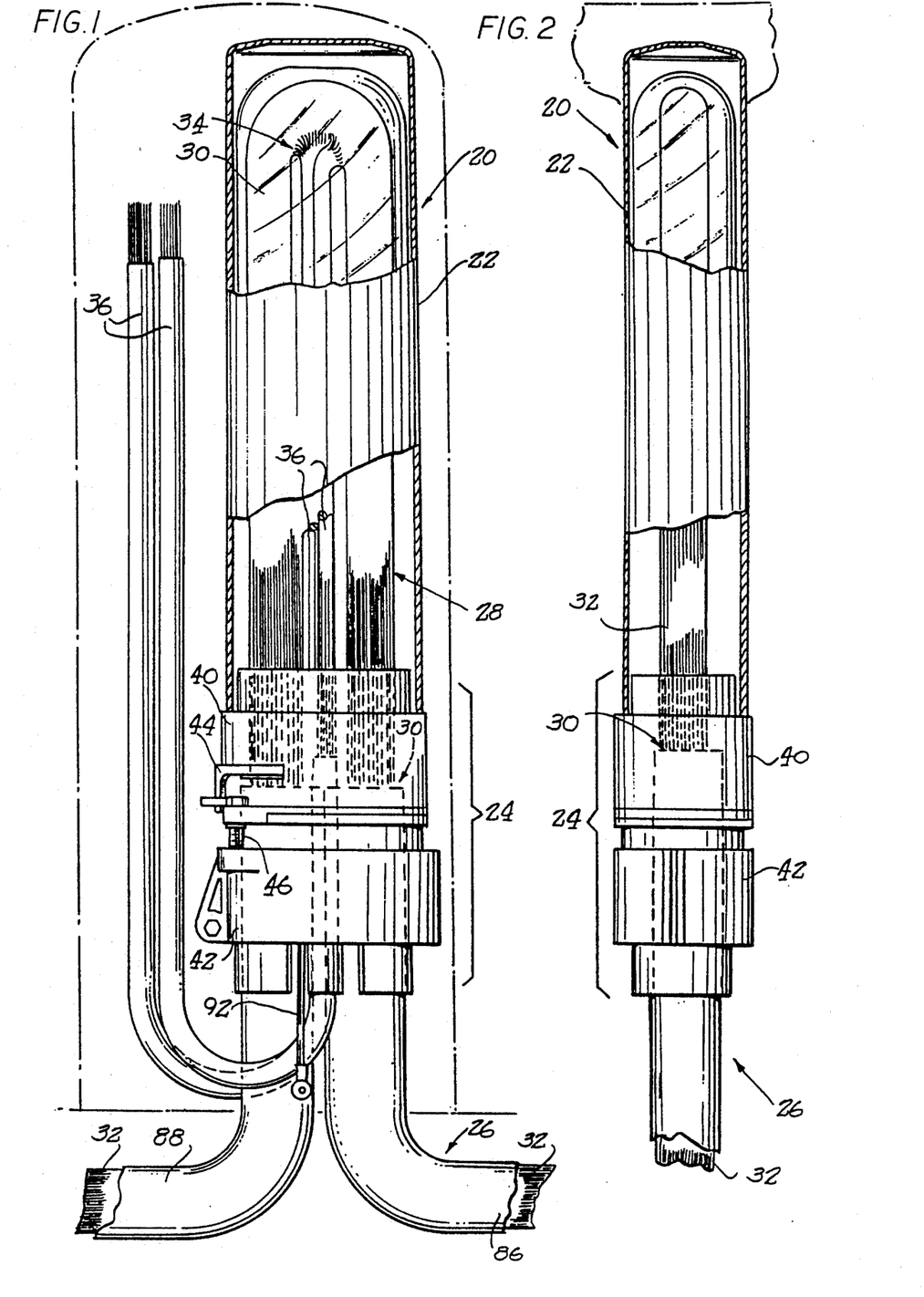
FIG. 1 is a partially broken away side view of a splice enclosure which is reenterably sealed in accordance with the invention.
FIG. 2 is a side view of the splice enclosure rotated approximately 90° from the view illustrated in FIG. 1.

As shown in FIGS. 1 and 2, a splice enclosure 20 is illustrated comprising a dome member 22 and sealing means 24. As illustrated in FIG. 1, a primary cable 26 has a looped portion 28 extending into the splice enclosure 20 through the sealing means 24. The primary cable may be any type of cable including, but not limited to; copper telecommunications cable, fiber optic cable as well as power cables. A portion of a cable jacket 30 is removed from the looped portion 28 to expose multiple binder groups 32 which comprise the primary cable 26. Splice connections 34 are made to selected wire pairs of a binder group 32 so that selected individual service cables 36 may be routed to user locations.

The splice enclosure 20 seals the splice connections 34 inside of the dome member 22 by sealing an open end 48 of the dome member with the sealing means 24. The sealing means 24 comprise an upper seal neck member or portion 40 and a lower split shell member or portion 42. As will be described in greater detail hereinbelow, the dome member 22 sealably attaches to the upper seal neck portion 40 by means of a spline 44 and the upper seal neck member 40 is longitudinally engaged with the lower split shell member 42 by means of fastener 46.

Viewed from the side, the splice enclosure 20 accommodates the looped portion 28 of the primary cable 26. As shown in greater detail in FIG. 3, the dome member 22, upper seal neck member 40 and lower split shell member 42 may be cross-sectionally oval shaped or circular members in various sized embodiments.

Figures 3, 4, 5:
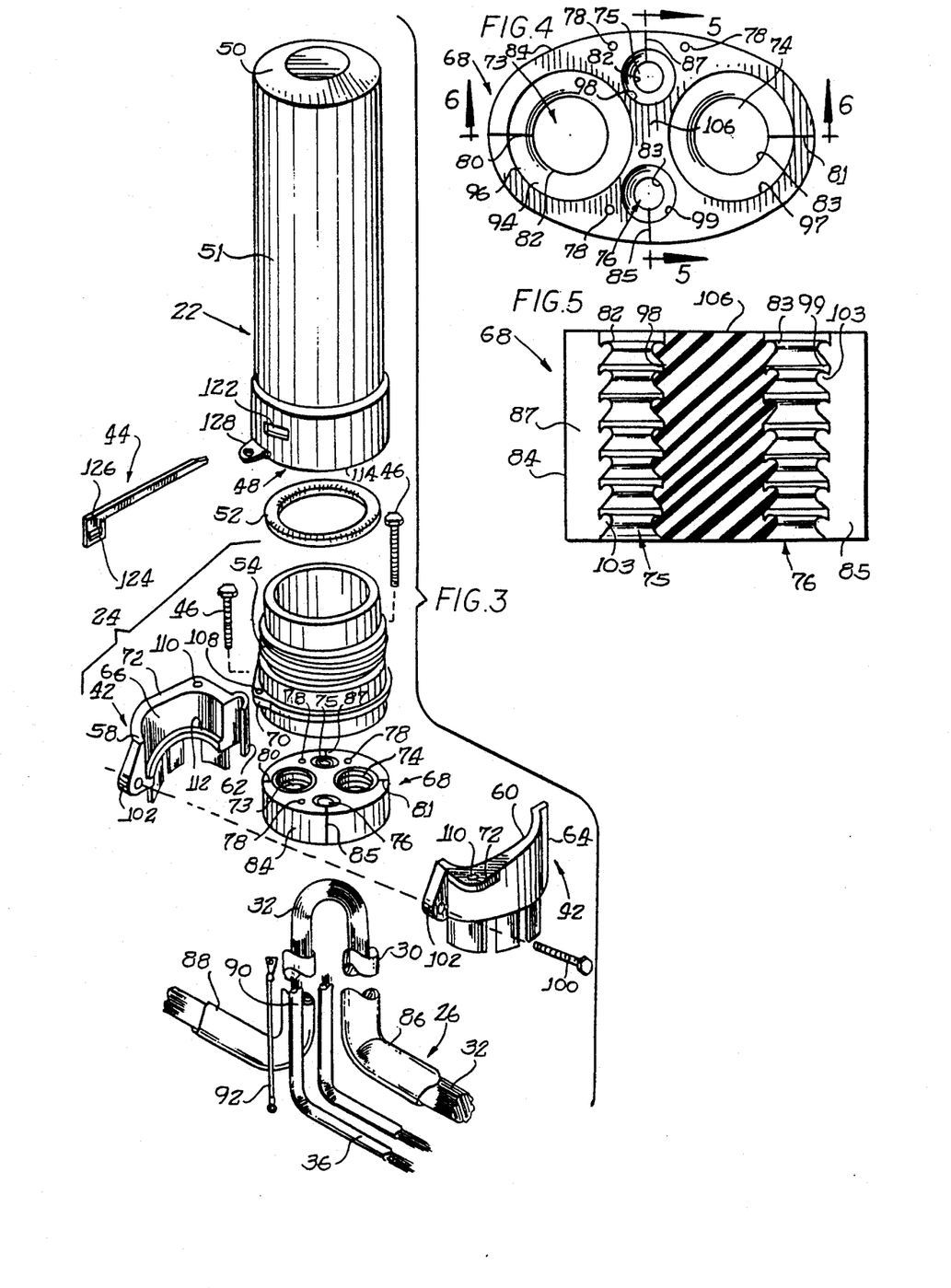
FIG. 3 is an exploded perspective view of the splice enclosure of FIGS. 1 and 2.
FIG. 4 is a plan view of a sealing member.
FIG. 5 is an enlarged cross-sectional view of the sealing member taken along the line 5—5 in FIG. 4.

FIG. 3 provides an exploded perspective view of the splice enclosure providing further detail thereof. The dome member 22 is a generally tubular member (shown with a cross-sectionally circular shape in FIG. 3 and a cross-sectionally oval shape in FIGS. 4-6) having an end opening 48 formed in one end, and a closed top end 50 which is integrally formed with the tubular side wall portion 51 of the dome member 22. The dome member 22 fits over the upper seal neck member 40. An enclosure sealing O-ring 52 is positioned in an O-ring groove 54 formed on the outside of the upper seal neck member 40. The O-ring 52 compressibly seals against an inside surface of the dome member 22 to form a seal between the upper seal neck member 40 and the dome member 22. An annular groove 56 is formed below the O-ring groove 54, in both the dome 22, and the seal neck 40 cooperatively positioned to permit engagement by the lock spline 44 inserted thereinto through the aperture 122 in the dome side wall.

The lower split shell member 42 is formed with a first half or portion 58 and a second half or portion 60. The first portion 58 is formed with a hinge portion 62 which hingedly engages a hinge pin 64 formed in the second portion 60. The first and second portions 58, 60 form an oval or circular inner surface or receptacle 66 when joined. A sealing grommet member 68 is retained in the receptacle 66 and is longitudinally or axially compressed therein between the lower split shell member 42 and the upper seal neck member 40. Longitudinal or axial compression of the sealing member 68 between the lower split shell member 42 and the upper seal neck member 40 is accomplished by threaded fasteners 46 which engage seal neck flanges 70 and shell flanges 72. The longitudinal or axial direction of compression as used herein is to be understood as being with reference to the longitudinal axes of the cable portions as they pass through the sealing member 68.

As shown in greater detail in FIGS. 4 and 5, the sealing member 68 is formed with two primary cable apertures 73, 74, two service cable apertures 75, 76 and one or more ground cable apertures 78. The primary cable and service cable apertures 73, 74, 75 and 76 are formed with radial slits 80, 81, 85 and 87 which extend from an edge 82 of each of the cable apertures 73, 74, 75 and 76 outwardly towards an outside surface or outer periphery 84 of the sealing member 68. The radial slits allow the cable apertures 73, 74, 75 and 76 to be opened to receive an entering portion 86 and an exiting portion 88 of the looped portion 28 of the primary cable 26 and the lengths of service cables 36. The ground cables 92 are axially inserted through the ground cable apertures 78 for appropriate attachment to the primary cable 26 and service cables 36. Alternatively, the service cable apertures may not have radial slits, for those new installations where the service cable ends are not already spliced to the primary cable and can therefore be inserted through an unslit hole.

The sealing member 68, as shown in FIGS. 3-6 is a single piece unitary body integrally formed of a resiliently compressible material. Preferably, the sealing member 68 is formed of a polyether or polyester based polyurethane with a Shore A hardness of 3 to 40, but preferably on the order of A7 to A20. The sealing member 68 is composed of a material chosen to provide sealing of the splice enclosure 20 over a range of environmental stress factors including exposure to moisture, temperature, and pressure extremes, and certain chemicals. The material employed for this purpose should provide optimum hydrolytic stability, low water absorption, resistance to dry heat aging, have a low compression set, and also be resistant to airborne pollution chemicals (including, but not limited to: oils, water displacing lubricants, service wire and cable filling compounds and splice encapsulants, insecticides, herbicides and hydrogen sulfide and corrosion cleansing solutions) and those commonly found in surface soil water tables (including, but not limited to: unleaded high octane gasoline, sodium hydroxide, trichloroethane and sulfuric acid) as well as resistance to airborne and soil salts and salt water. Ideally the material should not vary appreciably from its initial properties when subjected to such stress factors in field applications.

For example, a preferred set of criteria for sufficient sealing includes a minimum tensile strength of the material of substantially on the order of 70 psi; a minimum elongation of substantially on the order of 300%; minimum tear resistance of substantially on the order of 10 lbf/in; and compression set of less than substantially in the order of 8% after 8 days at 70° F. under 25% compression, measured substantially 30 minutes after release of compression. Specific examples of materials satisfying these criteria are designated as DEXTHANE 200 which is a material made by Dexter/Hysol Corporation of Seabrook, N.H. and as BIWAX No. 82,879, a product available from BIWAX Corporation, Des Plaines, Ill. This choice of material for the sealing member 68 assures that it will maintain an acceptable seal both about its outer periphery 84, which abuts the internal surfaces 66 of the seal neck 40 and split shell 42 and about the external peripheries of the entering and exiting cable portions 86, 88 of the primary cable 26 and the service cables 36 and ground cables 92 when subjected to field use conditions.

Figure 6:
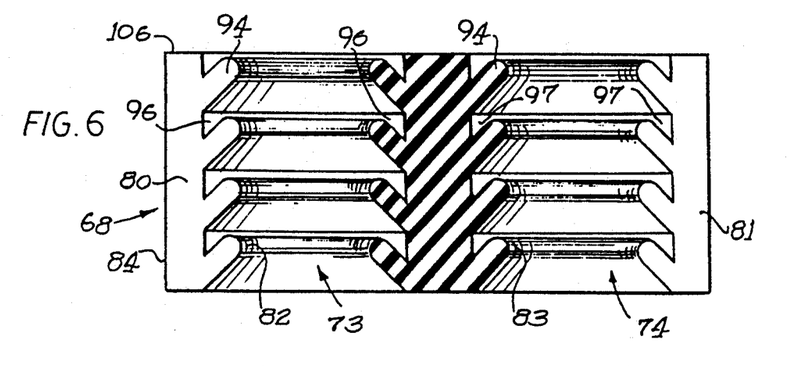
FIG. 6 is an enlarged cross-sectional view of the sealing member taken along the line 6—6 in FIG. 4.
Figure 7:
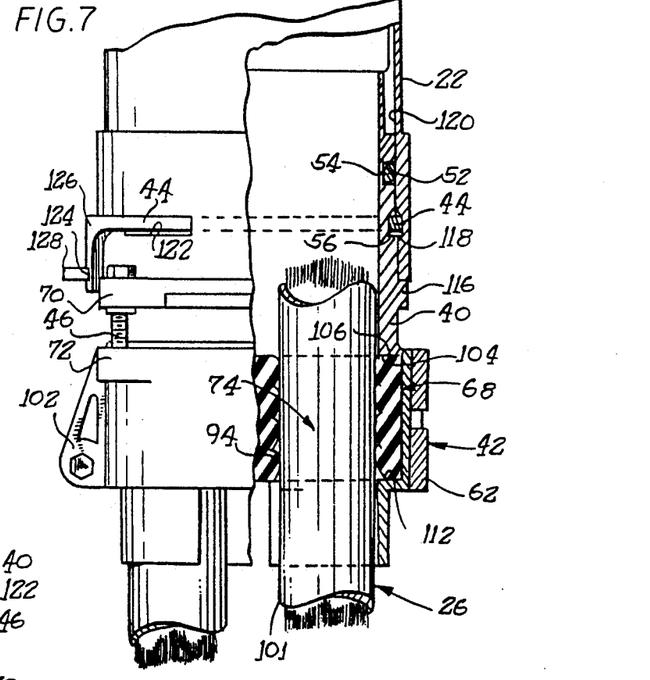
FIG. 7 is a partially broken away side view of longitudinal compression means used for longitudinally compressing the sealing member of FIGS. 4 and 6.

The cross sections of the sealing member 68 shown in FIGS. 5 and 6 illustrate in detail the interiors of the apertures 73, 74 and 75, 76. Each of these apertures is formed with a series of flutes 96, 97, and 98, 99 which define an axially spaced series of similar, flexible annular frustoconical rings 94, 103. These rings 94, 103 are formed along an inside surface of each primary cable aperture 73, 74 and an inside surface of each service cable aperture 75, 76. The flexible annular rings 94, 103 project upwardly and inwardly from the inside surfaces of the primary and service cable apertures 73, 74, 75, 76 at an angle of approximately 45°, and preferably terminate in rounded inner edges. With reference to FIG. 7, the annular rings 94 are shown in an upwardly compressed state between an external periphery 101 of the primary cable 26 and an inside surface of the primary cable aperture 74. The flexible annular form of the rings 94, 103 resiliently accommodate irregularities on the outside of the primary and service cables 26, 36 to assure a secure seal. These rings also accommodate primary and/or service cables over a range of diameters.

With reference to FIGS. 3 and 7, the sealed reenterable splice enclosure 20 is assembled by forming a looped portion 28 in the primary cable 26 and removing a portion of the cable jacket 30 therefrom to expose binder groups 32 contained within the primary cable 26. Entering and exiting portions 86, 88 of the primary cable 26 are inserted through primary cable apertures 73, 74 by separating the sealing member 68 at the radial slits 80, 81 to permit passage of a segment of each cable portion 86, 88 therethrough. Lengths of the spliced service cables 36 are inserted through the slits 85, 87 in the service cable apertures 75, 76. The ground cables 92 are inserted through the ground cable apertures 78 and appropriately attached to the primary cable 26.

Thus assembled, the sealing member 68 and the primary cable 26 and service cable 36 are positioned between the first and second portions 58, 60 of the lower split shell 42. The hinge portion 62 of the first portion 58 of the lower split shell 42 is engaged with the hinge pin 64 of the second portion 60. In a clam shell fashion, the first and second portions 58, 60 of the lower split shell 42 are closed around the outside surface 84 of the sealing member 68 to retain the sealing member 68 in the oval or circular receptacle 66 formed between the two portions 58, 60 of the lower split shell 42. Once fully closed, a fastener 100 is employed to attach apertured split shell engagement ears or brackets 102 cooperatively formed on opposing surfaces of the first and second portions 58, 60 of the lower split shell 42. The sealing member 68 is securely retained in the shell receptacle 66 in a generally uncompressed state.

Next, the upper seal neck member 40 is positioned with a bottom surface 104 thereof abutting a top surface 106 of the sealing member 68. Thus positioned, seal neck flange bores 108 formed through the seal neck flanges 70 are aligned with shell flange bores 110 formed through the shell flanges 72 for insertion of the threaded fasteners 46 therethrough. The threaded fasteners engage the threaded shell flange bores 110 to draw the lower split shell 42 and the upper seal neck 40 axially together thereby transferring axial or longitudinal compressive forces to the sealing member 68.

With reference to FIG. 7, the sealing member 68 is axially or longitudinally compressed between the bottom surface 104 of the seal neck member 40 and a bottom lip 112 formed in the bottom of the receptacle of the lower split shell member 42. Longitudinal compression of the sealing member 68 resiliently compresses the sealing member material thereby sealing its outer periphery 84 with shell receptacle 66 and also for sealing the radial slits 80, 81, 85, 87, the ground cable apertures 78, and the service and primary cable apertures 73, 74, 75, 76. The flexible annular rings 94, 103 formed in the primary cable and service cable apertures 73, 74, 75, 76 resiliently deform to form a seal between the outside periphery of the cables 26, 36 and the corresponding inside surfaces of the apertures 73, 74, 75, 76.

Lastly, the enclosure sealing O-ring 52 is positioned in the O-ring groove 54 formed towards the top end of the upper seal neck member 40. The dome member 22 is positioned over the upper seal neck member 40 and moved downwardly until a bottom edge 114 of the dome member 22 abuts a seal neck flange 116. Thus positioned, an annular groove 56 on the seal neck member 40 cooperatively aligns with a spline groove 118 formed on an inside surface 120 of the dome member 22. The flexible lock spline 44 is inserted through an access aperture 122 formed through the side of the dome member 22 to engage the cooperatively positioned annular and lock spline grooves 56, 118. The lock spline 44 acts to non-compressibly circumferentially engage and secure the dome member 22 with the seal neck member 40.

Figure 8:
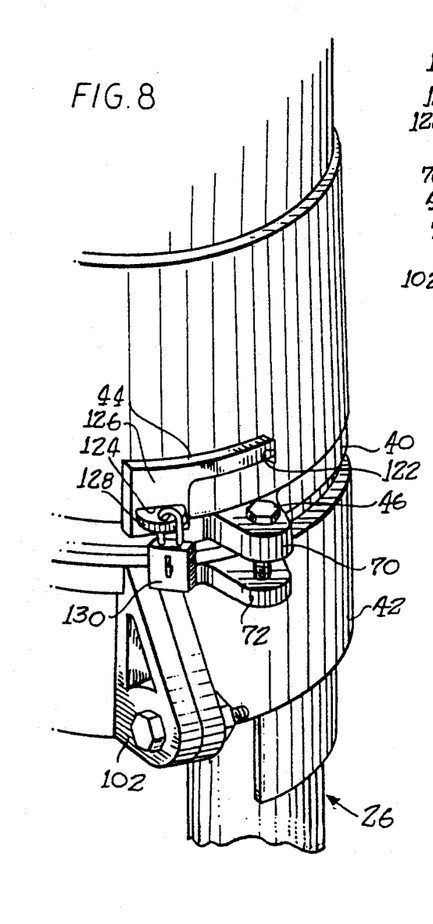
FIG. 8 is an enlarged partial perspective view showing the axial engagement between an upper seal neck portion and a lower shell portion and a spline which is employed to engage a dome member of the splice enclosure of FIGS. 1-3 with the upper seal neck portion.

With reference to FIG. 8, once the spline 44 has been fully inserted through the annular and spline grooves 56, 118 a slot 124 formed through a tab portion 126 formed on the end of the spline 44 defines a hasp-like structure which may be engaged with a staple or locking tab 128 formed on the outside of the dome member 22. Engagement of the slot 124 with the staple 128, and optionally the attachment of a lock or other security device 130 to the staple 128, prevents unintended release of the dome member 22 from the seal neck member 40.

In use, the sealed reenterable splice enclosure is assembled as described in detail hereinabove; reentry into the splice enclosure 20 is accomplished by disassembling the splice enclosure 20 through the inverse of the steps described above. However, if complete disassembly is not necessary extremely quick and efficient access to the splice connections 34 may be achieved by simply removing the dome member 22. Removal of the dome member requires only removing the security device 130 from the staple 128, releasing the tab portion 126 from the staple 128 and removing the lock spline 44 from the annular and spline grooves 56, 118. Upon removing the lock spline 44 the dome member 22 can be lifted free of the seal neck member 40 to expose the looped portion 28 of the primary cable 26 and the splice connections 34 made thereto. When the necessary operations are completed, the dome member 22 is replaced and attached as described above. When accessing the splice connections 34 or cables 26, 36 as described herein, the seal formed by the sealing member 68 need not be disturbed and need never be destroyed, as is common with prior art devices.

If a modification needs to be made to the splice enclosure 20, the enclosure 20 may be disassembled without destroying the sealing member 68 or requiring that a new sealing member 68 formed as is common with the prior art. For example, if a new service cable 36 needs to be installed, the splice enclosure is disassembled and the longitudinal compressive forces are removed by disengaging the seal neck member from the lower split shell member 42. Once the compressive forces are released, the seal neck member 40 is removed therefrom and the new service cable may be inserted through the sealing member 68, aperture 76 and spliced to the primary cable. The seal neck 40 is then attached to the shell 42 and reassembled with the rest of the splice enclosure 20 as described hereinabove.

It should also be clear from the drawings and the description provided hereinabove that the present invention may be employed to seal a tubular housing having two open ends. Such an open ended tube employs one sealing member 68 at each of the open ends to seal the contents therein. The sealing means 68 may be formed to provide the necessary number of apertures through which to project one or more members therethrough. Unused apertures may be sealed with a solid plug member of appropriate size to protect the contents of the sealed tube and/or dome-type enclosure from detrimental environmental effects.

Referring now to FIGS. 9 through 15 of the drawings, an alternative embodiment of the sealing member and the longitudinal compression means or assembly is illustrated. Reference is invited initially FIG. 9 in this regard.

Figures 9, 10, 11:
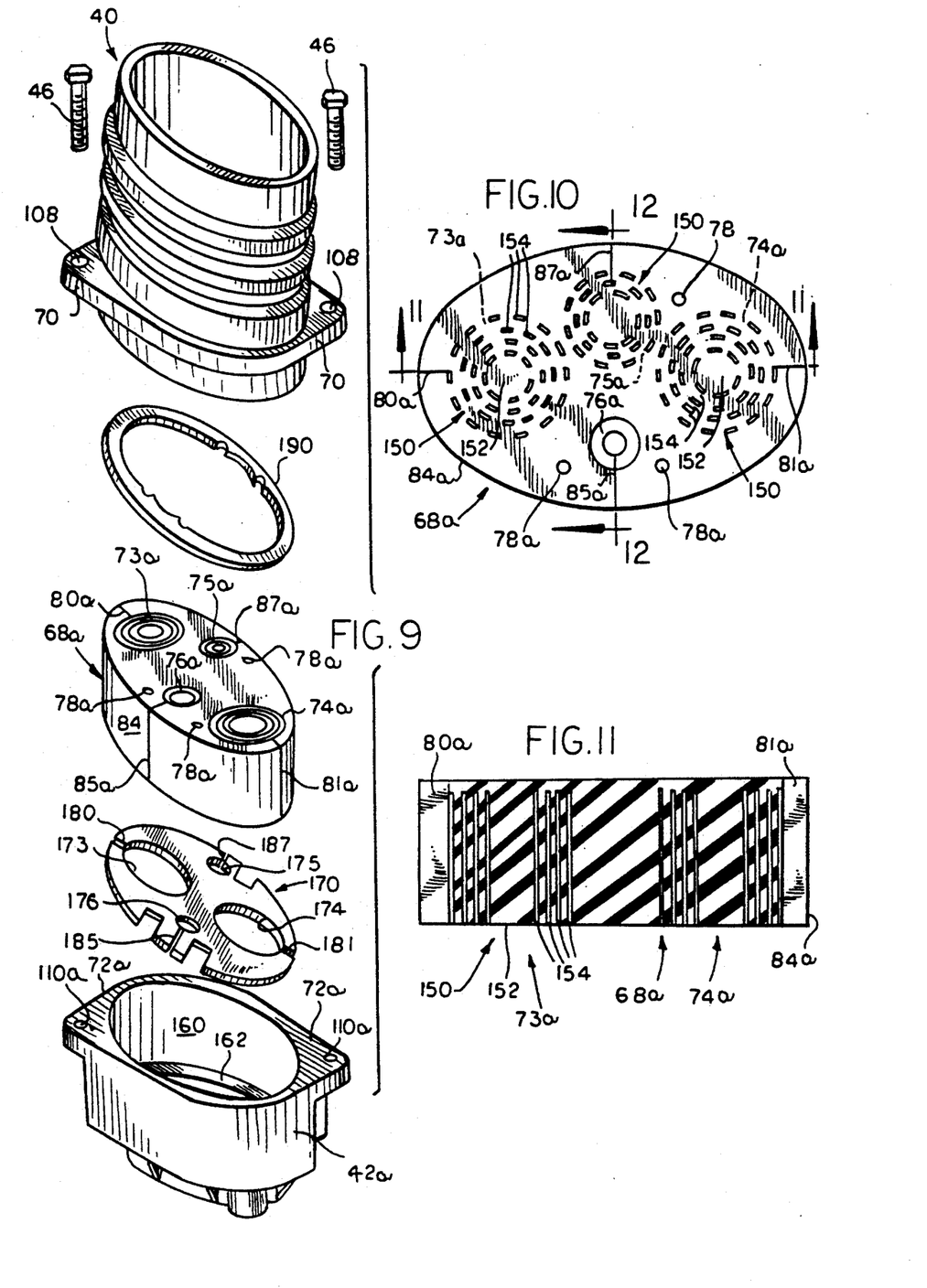
FIG. 9 is an exploded perspective view of an alternate form of sealing arrangement in accordance with the invention.
FIG. 10 is a view of an alternate form of sealing member utilized in the embodiment of FIG. 9.
FIGS. 11 and 12 are sectional views taken generally in the planes of the lines 11—11 and 12—12, respectively of FIG. 10.

As shown in FIG. 9, and in accordance with an alternate, and preferred form of the invention, the sealing member 68 as illustrated and described hereinabove is formed as shown in FIGS. 9 through 12. This alternate sealing member 68a, much like sealing member 68 described above is a single piece unitary body integrally formed of a resiliently compressible material.

Preferably, the material used is the same material described above with reference to sealing member 68 and having the same characteristics and properties.

In addition to those properties mentioned hereinabove, the material of both of these sealing members 68 and 68a preferably provides acceptable sealing characteristics at a nominal ambient temperature of approximately 70° F. and maintains acceptable sealing properties over a full range of temperatures from substantially −40° F. to +140° F. Preferably, both sealing members 68 and 68a are made from the DEXTHANE 200 material, which is mentioned hereinabove is made by Dexter/Hysol Corporation of Seabrook, N.H. Another material which satisfies most of the criteria mentioned hereinabove is designated as DEXTHANE 400 which is also a material made by Dexter/Hysol Corporation. However, the DEXTHANE 400 material has a nominal hardness of 40 Shore A, and hence does not meet the above-stated preferred range of A7 to A20. Thus the DEXTHANE 200 material is preferred for the formation of the sealing member 68a. Preferably, the sealing member 68a is formed by a molding process.

Figure 12:
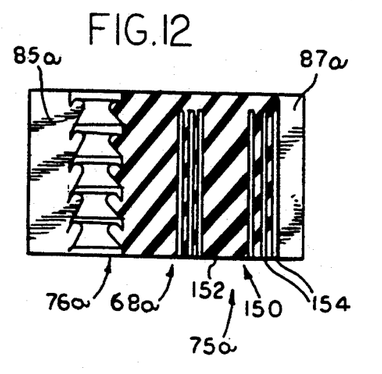
Figure 13:
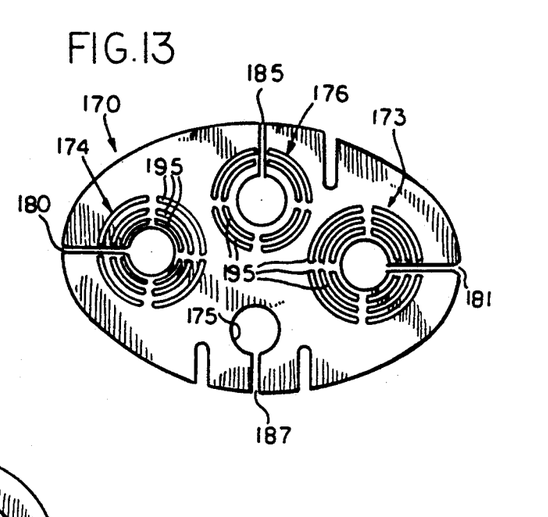
FIG. 13 is a plan view of a retainer plate member of the embodiment of FIG. 9.

Referring now also to FIGS. 10 through 12, the sealing member 68a has a plurality of apertures for receiving one or more cables or other conductors therethrough. These apertures include two primary cable apertures 73a and 74a, two service cable apertures 75a and 76a and one or more ground cable apertures 78a. Each of the primary cable and service cable apertures 73a, 74a, 75a and 76a are formed with radial slits 80a, 81a, 85a and 87a which extend to periphery 84a of the sealing member 68a.

Departing from the form of the sealing member 68 shown and described hereinabove, the preferred form of sealing member 68a has the primary cable apertures 73a, 74a and at least one service cable aperture 75a defined or formed by a removable means or structure designated generally by reference numeral 150. The aperture 76a and slit 85a are substantially identical in form to aperture 76 and slit 85 previously described hereinabove. This removable aperture-defining or forming structure 150 is of the same general form for each of these apertures, and hence only one such structure will be described in detail herein. Referring also to FIGS. 11 and 12, each of these removable aperture defining or forming structures 150 includes a solid and preferably generally cylindrical center piece or plug member 152 which is surrounded by a plurality of preferably concentric tubular and preferably hollow cylindrical portions 154. The same reference numerals 150, 152 and 154 are utilized herein to designate the like portions of the removable structure which define each of the apertures 73a, 74a and 75a. The plugs 152 and tubular members 154 extend to within about one-eighth to one-quarter inch from the bottom of sealing member 68a, i.e., not all the way through. Preferably, all of members 152 and 154 are formed with sealing member 68a in a single molding operation. Preferably, each of the slits 80a, 81a and 87a extend only to the radially outermost one of the respective concentric tubular members 154.

It will be recognized that the foregoing structure permits easy field sizing of each of the apertures to any one of a plurality of differently sized cables which may be selected for use with the sealed reenterable splice enclosure of the invention. The provision of the respective tubular members 154 and the inner plug-like member 152 permit working from the inside out to form an aperture of desired diameter for receiving a particular cable. Preferably, the cable is introduced by prying apart the sealing member about the corresponding slit (which is extended inwardly if and as necessary) and introducing the cable into the aperture formed as described above. With the proper size of aperture, sealing engagement of the sealing member 68a with the cable is assured. As further described hereinbelow, a shell member 42a (see FIG. 9) is a single piece integrally formed member rather than the split shell structure 42 illustrated and described hereinabove. That is, since the aperture can be adjusted in size to accommodate the size cable selected for use, radial bulging of the sealing member 68a upon cable introduction is minimized, thus permitting easy, slidable insertion of the sealing member 68a directly into the shell 42a. Moreover, the requirement that the sealing member 68a fit the shell encourages selection of the proper size aperture for a given cable.

Referring again to FIG. 9, as mentioned above the shell member 42a is a one-piece integrally formed unitary member. However, in similar fashion to the split shell structure described hereinabove, the shell 42a has outwardly extending shell flanges 72a which have through apertures 110a for engaging corresponding flanges 70 of the seal neck member 40 and aligning with through aperture 108 thereof. Hence, fasteners 46 are utilized in the same manner as described hereinabove to engage the seal neck 40 with the shell member 42a and to provide longitudinal or axial compression upon the sealing member 68a. Departing from the embodiment previously described, the shell 42a is a somewhat simplified form, defining an interior surface 160 substantially similar to the exterior surface 84 of sealing member 68a.

The shell 42a includes an interior peripheral inwardly extending rim or shoulder portion 162 for supporting a facing bottom surface of the sealing member 68a. In the preferred embodiment illustrated in FIG. 9, an additional retainer plate 170 is interposed between the shell 42a, and in particular the supporting rim or surface 162 thereof, and the facing or bottom surface of sealing member 68a. Preferably, the retainer plate is a relatively thin, firm support member which defines a surface configuration substantially similar to the facing surface of the sealing member 68a when the respective apertures have been formed therein. Hence, the retainer plate 170 has corresponding primary cable apertures 173, 174 and service cable apertures 175 and 176. Each of these apertures is preferably equipped with removable, concentric rings 195 which can be selected to provide an opening to match the opening selected in similar fashion by removal of plugs 152 and/or one or more tubular members 154 in the sealing member 68A. Each of the apertures in retainer plate 170 further has a generally radially outwardly extending slit which extends to the outer periphery of the retainer plate. The slits 180, 181, 185 and 187 correspond to and are generally in alignment with the slits 80a, 81a, 85a and 87a of the sealing member 68a. These corresponding slits of the retainer plate allow the introduction of the corresponding cables into the apertures therein.

Preferably, the retainer plate is of sufficient hardness to fully support and prevent any bulging or generally axial deformation of the material of the sealing member 68a in response to the compressive longitudinal forces applied thereto by and between the neck 40 and shell 42a. It will be seen that the surface shape of the retainer plate, being substantially identical to the surface configuration of the sealing member 68a provides good overall support to the sealing member 68a in this regard. Preferably, the retainer plate 170 is constructed by molding, from a polypropelene material having a typical hardness of at least on the order of Rockwell R 97. The preferred material exhibits a typical tensile strength of substantially 5,000 psi and a typical flexural modulus of substantially 220,000 psi.

Other materials might be used for the retainer plate 170 as long as they comprise a dielectric material so as to have electrically insulating properties, i.e., be electrically non-conductive. Such other material must also be sufficiently strong and stiff to offer firm support to substantially prevent bulging or like deformation of the sealing member 68a under axial or longitudinal compression. It should be recognized that such axial or longitudinal deformation or bulging may tend to relieve the compressive forces in axial direction rather than in the desired generally radial directions, as is desired to accomplish the desired sealing relative to the interior surface 160 of the shell 42a and relative to the sealing of the respective apertures against cables being fed into and out of the splice enclosure therethrough. Preventing excess deformation can also prevent tearing or fracture of the material of the sealing member 68a which might otherwise occur about the limited area or line of contact thereof with rim 162, absent the intervening retainer plate 170.

Figure 14:
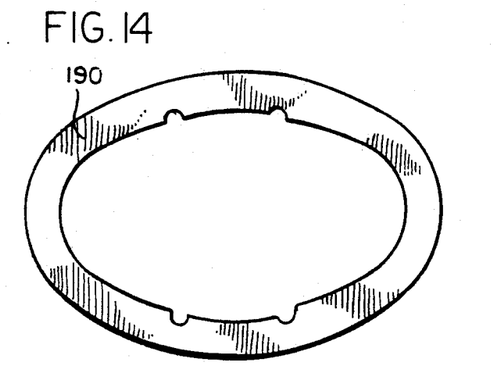
FIG. 14 is a plan view of a buffer ring member of the embodiment of FIG. 9.
Figure 15:
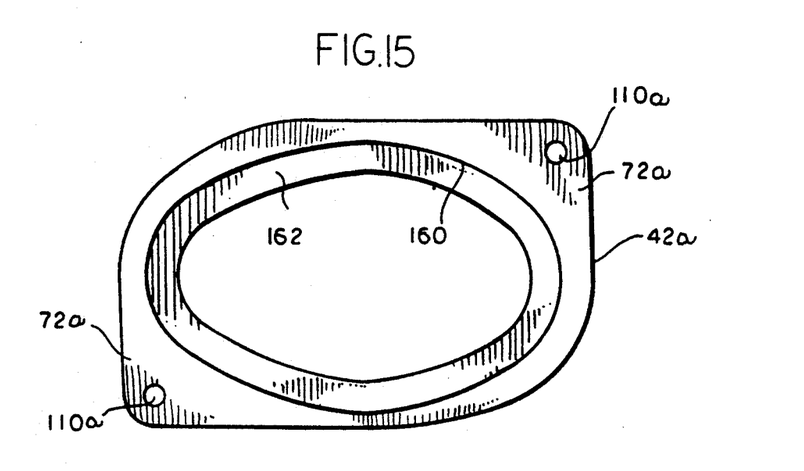
FIG. 15 is a top plan view of a shell member of the sealing arrangement of FIG. 9.

A final member of the sealing assembly of FIG. 9 comprises a buffer ring 190, configured as shown generally in FIG. 9 and also in plan view in FIG. 14. Buffer ring 190 is interposed between the facing surfaces of the sealing neck 40 and the sealing member 68a. The ring is preferably of a hardness of substantially Shore A60 minimum to Shore A80, that is, greater than that of sealing member 68a, but preferably less than that of the molded plastics neck member 40. The buffer ring 190 thus presents a buffer therebetween to prevent undue stress concentrations which might occur at the contact point or points during the application of compression by the neck 40 upon sealing member 68a absent buffer ring 190. The buffer ring is preferably formed from a neoprene material such as that known by the generic name chloroprene.

In addition to the above-mentioned criteria, the preferred material for sealing members 68 and/or 68a exhibits a compression set of no more than about 2.5%, no more than about 1.3%, and no more than about 0.8%, respectively, measured 1 hour, 24 hours and 7 days, respectively, after release of compression at the end of the 8 days at 70° F. under 25% compression as described hereinabove.

Advantageously, the above-described provision of multiple concentric tubular knock-out members or portions permits a much closer matching of a aperture size to cable size. This also permits a single molded sealing member 68a to accommodate a much greater range of sizes of cables than possible with the embodiment shown and described hereinabove.

While particular embodiments of the present invention have been shown and described in detail herein, it may be obvious to those skilled in the art that changes and modifications of the present invention in its various aspects, may be made without departing from the invention and its broader aspects, some of which changes and modifications being matters of routine engineering or design and others being apparent after study. As such, the scope of the invention should not be limited by the particular embodiments and specific constructions described herein, but should be defined by the appended claims and equivalents thereof. Accordingly, the aim of the appended claims is to cover all such changes and modifications as fall within the true spirit and scope of the invention.

The invention is claimed as follows:

1. A reenterable splice enclosure for isolating a portion of a cable positioned therein and splice connections made thereto from detrimental environmental effects, said enclosure comprising: a housing for covering splice connections, said housing having at least one opening for receiving splice connections; and sealing means for sealing said opening to protect splice connections from detrimental environmental effects; said sealing means including a sealing member and longitudinal compression means; removable means in said sealing member for defining at least one through aperture for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough; wherein said longitudinal compression means includes a shell portion configured for receiving said sealing member therein and having a support surface therein for supporting said sealing member; wherein said sealing member is a single piece body integrally formed of a resiliently compressible material; and wherein said sealing member is formed of a material characterized by, tensile strength of at least substantially on the order of 70 psi, elongation of at least substantially on the order of 300%, tear resistance of at least substantially on the order of 10 lbf/in, and compression set of less than substantially on the order of 8% after 8 days at 70° F. under 25% compression.

2. A splice enclosure according to claim 1, wherein said sealing member is formed of a material characterized by, hydrolytic stability, resistance to dry heat aging, low compression set, and resistance to atmospheric and surface water-borne substances.

3. A splice enclosure according to claim 1, wherein said removable means comprises a plurality of generally concentric tubular rings surrounding a center plug-like member, said center plug-like member and said tubular rings being selectively removable to define said at least one through aperture in said sealing member for receiving and sealing against said at least one cable portion passing therethrough over a predetermined range of cable sizes.

4. A splice enclosure according to claim 1, wherein said sealing member is compressed by said longitudinal compression means in a longitudinal direction relative to a longitudinal axis extending through said aperture formed in said sealing member, said longitudinal compression of said sealing member deforming said sealing ;member generally radially outwardly against an inside surface of said longitudinal compression means and generally radially inwardly against an outside surface of at least one cable portion projecting through said aperture into said housing for sealing with said opening and with said cable portion.

5. A splice enclosure according to claim 1, wherein said shell member comprises a unitary, one-piece integrally formed member.

6. A reenterable splice enclosure for isolating a portion of a cable positioned therein and splice connections made thereto from detrimental environmental effects, said enclosure comprising: a housing for covering splice connections, said housing having at least one opening for receiving splice connections; and sealing means for sealing said opening to protect splice connections from detrimental environmental effects; said sealing means including a sealing member and longitudinal compression means; removable means in said sealing member for defining at least one through aperture for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough; wherein said longitudinal compression means includes a shell portion configured for receiving said sealing member therein and having a support surface therein for supporting said sealing member; wherein said longitudinal compression means further includes a seal neck member configured for applying force for compressing said sealing member within said shell portion and in a direction generally toward said support surface thereof, said neck member having a compression surface generally facing said sealing member, and further including a generally annular buffer ring member interposed between said compression surface and said sealing member for generally reducing stress concentration and spreading said compressive force from said neck over a relatively larger area of said sealing member.

7. A splice enclosure according to claim 6, and further including: mutually alignable annular grooves on corresponding surfaces of said seal neck member and said housing; an access aperture through said housing proximate to said annular grooves; a linearly rigid and circumferentially flexible spline member sized and dimensioned for insertion through said access aperture and into said annular grooves for removably attaching said housing to said seal neck member.

8. A splice enclosure according to claim 7, further including a sealing groove formed on an outside surface of the seal neck member non-coincident with said annular grooves formed on corresponding surfaces of said seal neck member and said housing; an enclosure sealing O-ring insertable into said sealing groove forming a seal between said seal neck member and an inside surface of said housing.

9. A splice enclosure according to claim 6, wherein said buffer ring has a minimum hardness of substantially on the order of Shore A60.

10. A splice enclosure according to claim 9, wherein said buffer ring is fabricated from a chloroprene type of material.

11. A reenterable splice enclosure for isolating a portion of a cable positioned therein and splice connections made thereto from detrimental environmental effects, said enclosure comprising: a housing for covering splice connections, said housing having at least one opening for receiving splice connections; and sealing means for sealing said opening to protect splice connections from detrimental environmental effects; said sealing means including a sealing member and longitudinal compression means; removable means in said sealing member for defining at least one through aperture for passage of at least one cable portion therethrough, and said longitudinal compression means releasably engaging and longitudinally compressing said sealing member, said sealing member being responsive to said engagement and longitudinal compression for sealing about its outer periphery and about said at least one cable portion projecting therethrough; wherein said longitudinal compression means includes a shell portion configured for receiving said sealing member therein and having a support surface therein for supporting said sealing member; and further including a retainer plate interposed between said support surface and a facing surface of said sealing member for supporting and retaining said sealing member and comprising a generally flat, plate-like member having removable means for defining one through opening therein generally coincident with said at least one through aperture to be formed in said sealing means.

12. A splice enclosure according to claim 11, wherein said retainer plate further has a tensile strength of on the order of 5,000 psi, and a flexural modulus of on the order of 220,000 psi.

13. A splice enclosure according to claim 12, wherein said retainer plate is typically molded from a polypropelene material.

14. A splice enclosure according to claim 11 wherein said retainer plate has a hardness of at least on the order of Rockwell R 97.

15. A splice enclosure according to claim 11, wherein said removable means of said sealing member comprises a plurality of generally concentric tubular rings surrounding a center plug-like member, said center plug-like member and said tubular rings being selectively removable to define said at least one through aperture in said sealing member for receiving and sealing against said at least one cable portion passing therethrough over a predetermined range of cable sizes.

16. A splice enclosurer according to claim 15, wherein said removable means of said retainer plate comprises a plurality of generally concentric annular rings surrounding a center opening, said annular rings being selectively removable to define said at least one through opening of a size to match the size of a corresponding through aperture selected in said sealing member.

17. A sealing arrangement for a reenterable splice enclosure for isolating a portion of a cable position therein and splice connections made thereto from detrimental environmental effect, said splice enclosure comprising a housing having at least one opening for receiving a cable; said sealing arrangement comprising: a sealing member and longitudinal compression means; removable means in said sealing member for defining at least one cable portion therethrough; said longitudinal compression means releasably engaging and longitudinal compressing said sealing member; said sealing member being responsive to said engagement and longitudinal compression for sealing about its outer periphery and about said at least one cable portion projecting therethrough; and wherein said longitudinal compression means includes a shell portion configured for receiving said sealing member therein and having a support surface therein for supporting said sealing member and further including a retainer plate interposed between said support surface and a facing surface of said sealing means for supporting and retaining said sealing member and comprising a generally flat, plate-like member having means for defining at least one through opening therein generally coincident with said at least one through aperture to be formed in said sealing means.

18. A sealing arrangement according to claim 17, wherein said sealing member is a single piece body integrally formed of a resiliently compressible material.

19. A sealing arrangement according to claim 18, wherein said sealing member is formed of a material characterized by, hydrolytic stability, resistance to dry heat aging, low compression set, and resistance to atmospheric and surface water-borne substances.

20. A sealing arrangement according to claim 18, wherein said sealing member is formed of a material characterized by, tensile strength of at least substantially on the order of 70 psi, elongation of at least substantially on the order of 300%, tear resistance of at least substantially on the order of 10 lbf/in, and compression set of less than substantially on the order of 8% after 8 days at 70° F. under 25% compression.

21. A sealing arrangement according to claim 17, wherein said removable means comprises a plurality of generally concentric tubular rings surrounding a center plug-like member, said center plug-like member and said tubular rings being selectively removable to define said at least one through aperture and said sealing member for receiving and sealing against said at least one cable portion passing therethrough over a predetermined range of cable sizes.

22. A sealing arrangement according to claim 17, wherein said shell portion comprises a unitary, one-piece integrally formed member.

23. A sealing arrangement according to claim 17, wherein said retainer plate has a hardness of at least on the order of Rockwell R 97.

24. A sealing arrangement according to claim 17, wherein said retainer plate further has a tensile strength of on the order of 5,000 psi, and a flexural modulus of on the order of 220,000 psi.

25. A sealing arrangement according to claim 24, wherein said retainer plate is molded from a polypropelene material.

26. A sealing arrangement for a reenterable splice enclosure for isolating a portion of a cable position therein and splice connections made thereto from detrimental environmental effects, said splice enclosure comprising a housing having at least one opening for receiving a cable; said sealing arrangement comprising: a sealing member and longitudinal compression means; removable means in said sealing member for defining at least one cable portion therethrough; said longitudinal compression means releasably engaging and longitudinal compressing said sealing member; said sealing member being responsive to said engagement and longitudinal compression for sealing about its outer periphery and about said at least one cable portion projecting therethrough; and wherein said longitudinal compression means includes a shell portion configured for receiving said sealing member therein and having a support surface therein for supporting said sealing member wherein said longitudinal compression means further includes a seal neck member configured for applying force for compressing said sealing member within said shell portion and in a direction generally toward said support surface thereof, said neck member having a compression surface generally facing said sealing member, and further including a generally annular buffer ring member interposed between said compression surface and said sealing member for generally reducing stress concentration and spreading said compressive force from said seal neck member over a relatively larger area of said sealing member.

27. A sealing arrangement according to claim 26, wherein said buffer ring member has a minimum hardness of substantially on the order of Shore A60.

28. A sealing arrangement according to claim 27, wherein said buffer ring member is fabricated from a chloroprene type of material.

29. A method of sealing a splice enclosure comprising a housing with an opening for receiving splice connections for isolating a portion of at least one cable positioned therein and splice connections made thereto from detrimental environmental effects, said method comprising the steps of: providing a housing an sealing means including a resiliently compressible sealing member having removable means for defining at least one aperture through which a cable projects, and longitudinal compression means for retaining and longitudinally compressing said sealing member; removing a portion of said removable means to form at least one aperture of a desired size; positioning at least one cable in said housing and through said aperture formed in said sealing member; engaging said sealing member with said longitudinal compression means: applying longitudinal compressive forces to said longitudinal compression means to thereby compress and deform said sealing member generally radially outwardly to seal against said opening and generally radially inwardly to seal said aperture against at least one cable projecting therethrough wherein said sealing member is formed of a material characterized by, tensile strength of at least substantially on the order of 70 psi, elongation of at least substantially on the order of 300%, tear resistance of at least substantially on the order of 10 lbf/in, and compression set of less than substantially on the order of 8% after 8 days at 70° F. under 15% compression.

30. A method according to claim 29 and further including, prior to said applying longitudinal compressive forces, providing a retainer plate between said longitudinal compression means and said sealing member.

31. A method according to claim 30 and further including, prior to said applying longitudinal compressive forces, providing an buffer ring between said longitudinal compression means and said sealing member at a side of said sealing member generally opposite said retainer plate.

32. A sealing arrangement for a reenterable splice enclosure for isolating a portion of a cable position therein and splice connections made thereto from detrimental environmental effects, which reenterable splice enclosure includes a housing having at least one opening for receiving a cable; said sealing arrangement comprising: a sealing member and longitudinal compression means; said sealing member defining at least one through aperture for passage of at least one cable portion therethrough; said longitudinal compression means releasably engaging and longitudinally compressing said sealing member; said sealing member being responsive to said engagement and longitudinal compression for sealing about its outer periphery and about said at least one cable portion projecting therethrough; and wherein said longitudinal compression means includes a shell portion configured for receiving said sealing member therein and having a support surface therein for supporting said sealing member and a retainer plate interposed between said support surface and a facing surface of said sealing means for supporting and retaining said sealing member.

33. A sealing arrangement according to claim 32, wherein said longitudinal compression means further includes a seal neck member configured for applying force for compressing said sealing member within said shell member and in a direction generally toward said support surface thereof, said neck member having a compression surface generally facing said sealing member, and further including a generally annular buffer ring member interposed between said compression surface and said sealing member for generally reducing stress concentration and spreading said compressive force from said neck over a relatively larger area of said sealing member.

* * * * *

UNITED STATES PATENT AND TRADEMARK OFFICE
CERTIFICATE OF CORRECTION

PATENT NO. : 5,235,134
DATED : August 10, 1993
INVENTOR(S) : Donald F. Jaycox

It is certified that error appears in the above-indentified patent and that said Letters Patent is hereby corrected as shown below:

Column 13, Line 55 "enclosurer" should be -- enclosure --
Column 16, Line 4 "15%" should be --25%--
Column 16, Line 11 " an " should be --a --

Signed and Sealed this

Twenty-second Day of February, 1994

Attest:

BRUCE LEHMAN

*Attesting Officer*     *Commissioner of Patents and Trademarks*